Figure 1:
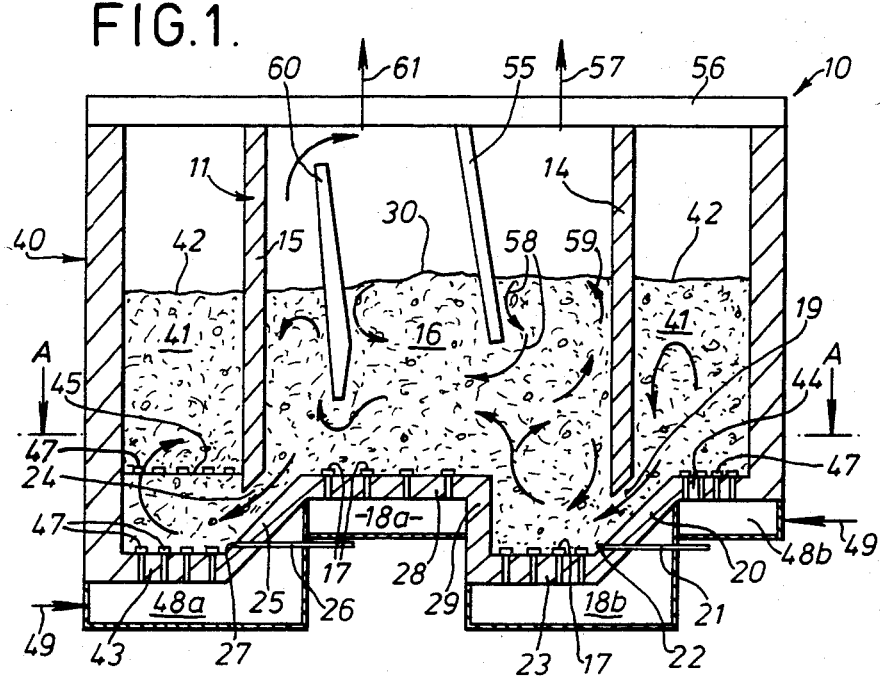

United States Patent [19]

Moss

[11] Patent Number: 4,517,162

[45] Date of Patent: May 14, 1985

[54] APPARATUS FOR USE IN PROCESSING A SUBSTANCE IN A FLUIDIZED BED

[75] Inventor: Gerald Moss, Wantage, England

[73] Assignee: Exxon Research and Engineering Co., Florham Park, N.J.

[21] Appl. No.: 384,472

[22] Filed: Jun. 3, 1982

[51] Int. Cl.³ .......................... B01J 8/18; F27B 15/00
[52] U.S. Cl. .................................. 422/142; 34/57 A; 422/143; 422/144; 422/145; 431/7; 431/170; 432/15; 432/58
[58] Field of Search ................ 422/142, 143, 144, 145, 422/146, 233; 48/202, 210; 34/57 A; 432/15, 58; 431/7, 170; 122/40

[56] References Cited

U.S. PATENT DOCUMENTS

| | | | |
|---|---|---|---|
| 2,521,195 | 9/1950 | Wheeler, Jr. | 422/144 |
| 2,538,235 | 1/1951 | Coffey et al. | 23/212 |
| 2,985,515 | 5/1961 | McKinley | 422/145 X |
| 3,717,700 | 2/1973 | Robison et al. | 423/244 |
| 3,870,480 | 3/1975 | Moss et al. | 48/71 |
| 3,969,089 | 7/1976 | Moss et al. | 48/197 R |
| 4,259,088 | 3/1981 | Moss | 422/143 X |

FOREIGN PATENT DOCUMENTS

| | | |
|---|---|---|
| 1358 | 9/1978 | European Pat. Off. |
| 13590 | 1/1980 | European Pat. Off. |
| 2287497 | 10/1975 | France |
| 916482 | 9/1960 | United Kingdom |
| 1500231 | 4/1974 | United Kingdom |
| 1504688 | 4/1974 | United Kingdom |
| 1379578 | 1/1975 | United Kingdom ................ 431/170 |
| 1485319 | 10/1975 | United Kingdom |
| 2074302A | 4/1980 | United Kingdom |

Primary Examiner—Barry S. Richman
Assistant Examiner—William R. Johnson
Attorney, Agent, or Firm—Edward H. Mazer; Robert J. North; Roy J. Ott

[57] ABSTRACT

The apparatus comprises a process vessel, containing a process bed of fluidized particles, having a first submerged port at a first end and a second submerged port at a second end. Both ports are inclined in the same sense so that particles leave the second end of the bed at a higher level than they enter the first end. Fluidized bed material entering the second port becomes defluidized and slides down the port, optionally with the assistance of a fluid injected into the port. The first port conducts particles into the process bed from a second fluidized bed and the second port conducts particles out of the process bed (e.g. into the second bed). The process bed rests on a fluid distributor having a horizontal first part adjoining, and no higher than the level of, the lower end of the first port and a horizontal second part adjoining, and at the level of, the second port, there being a vertical step connecting the first and second distributor parts at a location between the first and second ports. In operation, particles at the bottom layers of the process bed are transferred relatively rapidly from the first port to the second port, while particles at higher levels in the bed have relatively prolonged residence times in the bed.

13 Claims, 2 Drawing Figures

U.S. Patent May 14, 1985 4,517,162

APPARATUS FOR USE IN PROCESSING A SUBSTANCE IN A FLUIDIZED BED

The present invention relates to apparatus for use in processing a substance in a fluidized bed.

Fluidized beds are widely used to effect chemical and/or catalytic and/or physical changes in substances. The fluidized bed material may be employed to heat or cool the substances and/or to react chemically with the substances, and there are many applications of fluidized bed processing in which it is desirable to achieve a relatively rapid throughput of fluidized bed material with a relatively long residence time of the substance being processed in the fluidized bed. These apparently conflicting goals are achieved by the present invention which provides apparatus for use in processing a substance in a fluidized bed processing zone, the apparatus comprising a process vessel for containing a fluidized particles bed of the processing zone in a bed space up to a selected level, the process vessel having an entrance opening below the selected level defined by an underflow entrance weir and an exit opening below the selected level defined by an underflow exit weir, a downsloping entrance ramp defining the bottom of the entrance opening, the entrance ramp sloping downwardly from an upper end outside the process vessel and above the entrance opening to a lower end inside the process vessel, a first fluidizing fluid distributor operable to pass fluidizing fluid into the base of an entrance zone of the fluidized bed space adjoining the lower end of the entrance ramp at such a rate as to remove bed particles from the lower end of the entrance ramp by fluidization at least as fast as bed particles pass into the bed space from the entrance opening so that, during operation, there is substantially no accumulation of bed particles at the lower end of the entrance ramp, supply means for passing into the entrance zone of the bed the substance to be processed in the fluidized bed, a second fluidizing fluid distributor disposed substantially or approximately at the level of the upper end of the entrance ramp and extending from the entrance zone to an exit zone adjoining the exit opening, the second distributor being operable to form a stratified fluidized bed part at least in the vicinity of the exit zone, the exit opening being disposed for the exit from the process vessel of particles which are in a stratum adjacent to the second distributor for recovery of said particles and/or recirculation of at least some of said particles either directly or indirectly to the upper end of the entrance ramp, optionally there being provided an upright member in a substantially vertical plane between the first and second distributors which extends substantially from the level of the first distributor substantially to the level of the second distributor.

The said upright member may be part of, or form, a step extending upwards from the first fluid distributor to the second fluid distributor.

The apparatus may comprise an additional vessel for receiving at one end region particles passing out of the process vessel via the said exit opening thereof, there being a fluidizing fluid distributor for passing a fluidizing fluid into the said one end region of the additional vessel to fluidize particles received therein in a fluidized bed space up to a selected level.

The additional vessel may communicate at another end with the entrance opening of the process vessel and with the upper end of the said entrance ramp protruding into the additional vessel at the said other end thereof whereby particles fluidized in the additional vessel pass down the said entrance ramp and via the entrance opening into the process vessel.

The apparatus may comprise an exit ramp which defines the bottom of the exit opening of the process vessel, the exit ramp sloping downwardly from an upper end inside the process vessel and above the exit opening thereof to a lower end inside the additional vessel at said one end thereof, and wherein the additional vessel is provided with a first fluidizing fluid distributor operable to pass fluidizing fluid into the base of a receiving zone of a fluidized bed space adjoining the lower end of the exit ramp at such a rate as to remove particles from the lower end of the exit ramp by fluidization at least at the same rate as particles pass through the exit opening so that there is substantially no accumulation of particles at the lower end of the exit ramp, a second fluidizing fluid distributor disposed substantially or approximately at the same level as the upper end of the exit ramp and extending from the edge of the receiving zone substantially to the upper end of the said entrance ramp, the second distributor being operable to fluidize particles in the additional vessel, optionally there being provided in the additional vessel an upright member in a substantially vertical plane between the first and second distributors of the additional vessel and which extends substantially from the level of the first distributor substantially to the level of the second distributor. The said upright member in the additional vessel may be part of, or form, a step extending upwards from the first fluid distributor of the additional vessel to the second fluid distributor thereof.

During operation of the apparatus of the invention, the upper end of the exit ramp or the entrance ramp or the upper ends of both ramps will have substantially no fluidizing fluid passing upwardly above them, and accordingly, fluidized particles which pass to a position above the upper end of a respective ramp will have no upwardly-passing fluidizing fluid to maintain them in a fluidized suspended state (i.e. their upward aerodynamic drag in upwardly-passing fluidizing fluid will fall to zero or approximately zero), and as a result, they will fall under the action of their weight onto the upper end of the respective ramp. If the downward forces (e.g. those arising from the downward slope of the ramp in the manner described above) exceed the friction between particles thus received on the upper end of the ramp and between the particles and the ramp, the particles on the ramp will slide down the ramp into the entrance zone of the respective fluidized bed as particles are removed from the lower end of the ramp by the vigorous fluidization in the entrance zone of the fluidized bed. However, if friction inhibits such sliding, means may be provided to pass a transport gas into particles on the ramp, e.g. from holes or nozzles suitably disposed in the upper face of the ramp at appropriate positions thereof. The transport gas reduces friction between particles and between particles and the ramp by causing at least partial fluidization of the particles on the ramp, and thereby promotes the movement of particles down the ramp. The transport gas may be passed into the particles on the ramp with at least a component of velocity in the direction of the fluidized bed intended to receive the particles. The slope of the ramp may be no smaller than the angle of repose of the particles in order to enhance the tendency of particles to slide down the ramp.

Preferably, either the process vessel is at least partially received or incorporated in the additional vessel, or vice versa.

The apparatus may comprise at least one segregation baffle in the process vessel which extends downwardly from above the selected level to a level below the selected level but above the entrance and exit openings, the baffle at least partly surrounding the said entrance zone whereby to segregate products leaving the top of the entrance zone of the bed space at the selected level from products leaving the top of the bed space at the selected level at other parts of the bed space. In order to enhance the retention of the substance being processed in the fluidized process bed, the baffle may bound a greater area, in a horizontal plane, at the selected level with the wall having the entrance weir, than at lower levels.

To reduce solids entrainment from the bed, the process vessel may comprise an additional baffle extending perpendicular to the path of bed particles from the entrance opening to the exit opening of the process vessel bed, the additional baffle being at a location between the segregation baffle and the vessel wall having the exit weir, the additional baffle preferably extending downwardly from above the selected level to a level below the selected level but above the level of the entrance and exit openings.

There may be separating means for receiving fluids from the process vessel and at least partially separating entrained solids from said fluids, and means for returning at least some of the thus separated solids to a lower part of the entrance zone of the fluidized bed space.

Any such solids which are returned to the fluidized bed space may be returned in transport gas, if used, which is supplied to promote the downward movement of particles on the entrance ramp into the fluidized bed space.

The invention also provides a process for gasifying a fuel employing the apparatus as described above, the process comprising passing fuel via said supply means into the entrance zone of the process vessel when the bed space of the latter comprises a bed of particles fluidized by a gas passed into the bottom of the entrance zone of the bed space by said first distributor, providing a source of oxygen within the bed space so that the fuel is gasified in a self-sustaining gasification reaction system at a fuel gasification temperature, causing bed particles to pass into the fluidized bed via said entrance opening, and causing bed particles to pass out of the fluidized bed via said exit opening and recovering fuel gasification products from above the top level of the fluidized bed.

The particles passing into the fluidized bed via the entrance opening may comprise $CaSO_4$ which is substantially the sole or main source of oxygen for the gasification of the fuel and wherein the fluidizing fluid supplied to the fluidized bed is a gas which is subsantially free of inert substances which would dilute the fuel gasification products. The fluidizing fluid may comprise water vapour or steam, in amounts which are small in relation to the amounts normally employed for the steam gasification of carbonaceous fuel. The steam, if provided, is for the purpose of serving as a source of hydrogen which suppresses the liberation of sulfur moieties from $CaSO_4$ and $CaS$. Any steam gasification of carbon is preferably incidental to this purpose. The fluidizing fluid may be a portion of the fuel gasification products.

Preferably, the fluidization conditions within the fluidized bed are such that fuel passed into the process vessel is well mixed with bed particles by relatively vigorous bed fluidization in the entrance zone above the first distributor whereby to promote gasification reactions, and the fluidization of the bed above the second distributor is such as to promote the formation of a top stratum of the bed which is rich in fuel material which has not been gasified at least in the exit zone, the top stratum being above the top of the exit opening whereby bed particles passing out of the exit opening are substantially free of fuel material and whereby substantially no fuel material is lost from the process vessel via the exit opening.

Preferably, any entrained solids comprising fuel material are separated from fuel gasification products, and at least part of said separated solids is returned to the entrance zone of the fluidized bed for gasification of fuel material thus returned (e.g. employing the said transport gas, if the latter is used).

Preferably, the fluidization conditions within the bed are such that fuel material is at least partly maintained in a top region of the bed above bed solids passing through the bed space from the entrance opening to the exit opening with intermixing of fuel material and bed solids in a part of the bed between the top of the bed and the bottom of the said top region thereof.

Figure 2:
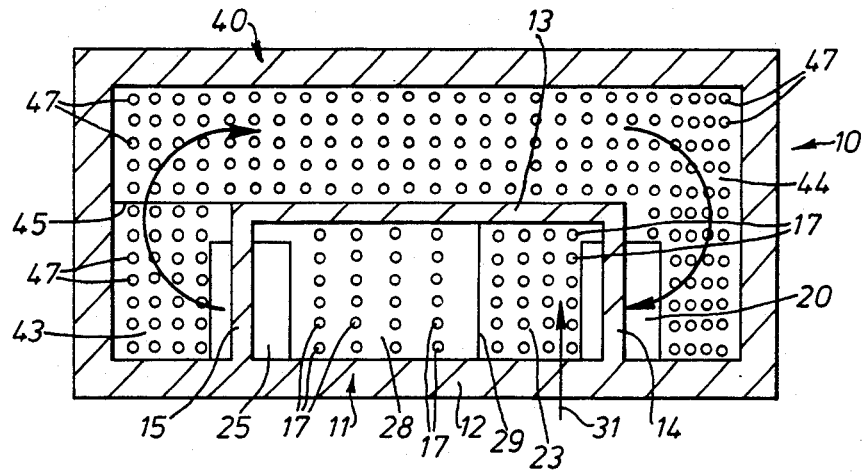

The invention is now further described with reference to an embodiment thereof, given by way of a non-limitative example, and with reference to the accompanying drawings in which:

FIG. 1 is a diagrammatic vertical cross-sectional elevation of the principal parts of an apparatus for use in converting a hydrocarbonaceous and/or carbonaceous fuel to a combustible gas, and FIG. 2 is a horizontal cross-sectional plan view, taken in the plane A—A of FIG. 1, of the apparatus, with some parts omitted.

It is to be understood that the apparatus is depicted schematically in the drawings.

The apparatus, generally indicated by reference 10, comprises a gasifier vessel 11 bounded by side walls 12 and 13 and end walls 14 and 15 in which a fuel is subjected to a gasification process in a bed 16 of fluidized solids. The solids of the fluidized bed 16 are fluidized by passing a fluidizing gas into the bottom of the bed 16 from suitable holes or nozzles 17 provided in the base of the vessel 11. The fluidizing gas is provided from a number of plena 18a, 18b beneath the base and which are in communication through ports (not shown) in the base with the holes or nozzles 17.

The bottom of the end wall 14 defines with the contiguous surface of the base an underflow entrance weir or port 19 for the entrance of solids to the bottom of the bed 16 at one end thereof. The base at the underflow entrance port 19, and also for some distance outside and inside the vessel 11 on each side of the port 19 has an inclined portion, which will be referred to as the entrance ramp 20, sloping downwardly into the vessel 11, and to the extent that the thickness of the end wall 14 permits, the bottom of the end wall forming the top of entrance port 19 is also downwardly inclined in the direction of the vessel 11. At least one conduit 21 extends through the ramp 20 and terminates at a nozzle 22 on the top surface of the ramp 20 within the vessel 11.

The bottom end of the entrance ramp 20 adjoins a lower base section 23 which is preferably substantially horizontal (as shown) and provided with nozzles 17 which receive fluidizing gas from plenum 18b.

The bottom of the end wall 15 at the other end of the bed 16 defines with the contiguous surface of the base an underflow exit weir or port 24 for the exit of solids; from the bottom of the bed 16. The base at the underflow exit port 24 and for some distance inside and outside the vessel 11 on each side of the exit port 24 has an inclined portion, which will be referred to as the exit ramp 25, sloping downwardly from a level within the vessel 11 substantially equal to the level of the top of the entrance ramp 20 down to a level substantially equal to that of the lower end of the entrance ramp 20 where it adjoins the lower base section 23. The bottom of the end wall 15 forming the top of the exit port 24 is also downwardly inclined in the same sense as the exit ramp 25 to the extent that the wall thickness permits. A conduit 26 extends through the ramp 25 and terminates at a nozzle 27 on the top surface of the ramp 25 outside the vessel 11.

An upper base section 28 extends preferably substantially horizontally (as shown) within the vessel 11 from the top end of the exit ramp 25 towards the walls 14, and a step 29 connects the contiguous ends of the lower base section 23 and the upper base section 28. The plenum 18a communicates through the upper base section 28 with the holes or nozzles 17 on the top surface thereof.

The bed 16 is arranged to have a top level 30 above the levels of the base sections 23 and 28 and the tops of the entrance and exit ports 19 and 24, and the fuel which is to be converted is passed into the vessel via one or more injection pipes 31 at such a level that the fuel is contacted by the fluidizing gas at least in the top layer of the bed 16.

For the conversion of hydrocarbonaceous fuel to combustible gas, relatively elevated temperatures are required, and the level at which the fuel is passed into the bed 16 will depend largely on the nature of the fuel, since in the case of liquid hydrocarbon fuels, injection at too high a level in the vessel 11 will reduce the contact time between bed solids and vapours and gases produced as a result of the contacting of hot bed solids and the fuel, and such vapours and gases may not be converted to the desired extent to the desired combustible gas products. In the case of solid fuels, the level of injection is less critical than with liquid fuels, and solid fuels may be dumped on the bed surface 30 in some instances, whereas liquid fuels will generally best be injected some distance below the surface 30 of the bed 16.

For operation of the apparatus as so far described, a fluidizing gas is supplied to plenum 18a and a fluidizing gas is supplied to plenum 18b to fluidize the bed solids in the bed 16. The rate of supply of fluidizing gas to the plenum 18b is such that the part of the fluidized bed 16 above the lower base section 23 and the nozzles 17 thereon is vigorously fluidized so that solids are removed from the lower end of the entrance ramp 20 by fluidization or a gas-lift effect, and circulated into the fluidized bed 16.

The removal of solids from the lower end of the entrance ramp 20 causes bed solids on the ramp 20 to move down the ramp via entrance port 19 and into the bed 16 under the action of the weight of bed solids higher up the ramp 20, provided friction does not prevent such movement.

The upper end of the exit ramp 25 extends into the interior space of the vessel 11 and substantially prevents fluidizing gas from the nozzles 17 of the upper base section 28 fluidizing the bed solids above the upper end of the exit ramp 25. As a result, bed solids passing above the exit ramp 25 collapse or slump onto the ramp 25, and the slumped bed solids slide down the ramp 25 and pass out of the bed 16 via the exit port 24, provided friction does not prevent such movement. If friction does prevent such movement, a suitable transport gas is passed intermittently or continuously through one or more conduits 26 to fluidize bed solids on the exit ramp 25, e.g. in the vicinity of the respective nozzles 27, so that the bed solids then pass down the exit ramp 25 and out of the fluidized bed 16 via exit port 24.

The slope of one or both of the ramps 20,25 may be at least equal to, and preferably greater than, the angle of repose of the bed particles to promote downward movement of particles and the respective ramp. Within the bed 16, the gas from the plena 18a, 18b causes fluidization of the bed solids which, in the usual way, will have relatively rapid vertical motion compared to their horizontal or lateral motion through the bed 16. The operation of the apparatus so far described ensures that the lateral motion of solids from the entrance port 19 to the exit port 24 can be regulated over a relatively wide range by regulating the rate of fluidizing gas from the nozzles 27 of the lower base section 23 and/or by regulating the transport gas rate. When the nature of the fuel and/or the manner in which it is introduced into the bed 16 is such that, under the fluidizing conditions in the bed 16, the fuel and products thereof tend to migrate to, and/or remain, in the top region of the bed 16 at least partially as a discrete stratum of fuel material, bed material may be passed into and removed from the bed 16 substantially without removing fuel material from the bed. For example, if the fuel is coal, its introduction into the top region of the bed 16 at coal gasification temperatures will cause the coal to devolatilize to give a coke of relatively low density which will form, at least in part, a relatively discrete stratum at the top region of the bed, particularly in the part of the bed 16 above the base section 28 where the fluidizing gas is injected into the bottom of the bed 16 at a relatively low rate, compared to the rate above the base section 23. The rate of gas injection from the nozzles 17 of base section 23 is preferably sufficiently high to cause substantially uniform mixing of the fuel and the bed solids so that they can interact chemically and/or physically relatively readily. The rate of gas injection from the nozzles 17 of the base section 28 is preferably lower so that, in the absence of any baffles promoting mixing, carbonaceous fuel solids would tend to separate into a fuel solids rich stratum at the top of the bed 16 above the base section 28. Such separation is not complete, even in the absence of baffles or other devices to promote mixing, and chemical and-/or physical interaction between bed solids and fuel solids continues to take place at least in a zone just below the bed surface 16 as bed solids pass horizontally in the direction of the exit opening 24. As a result of such interaction, fuel solids tend to become consumed from the top stratum of the bed 16 above the upper base section 28. For a liquid hydrocarbonaceous fuel such as oil, residuum or tarry material, a similar effect can be obtained by providing in the bed particulate solids of such weight to aerodynamic drag ratios that the fluidizing gas at certain selected rates and temperatures maintains them at least partly as a discrete stratum at the top region of the bed, and injecting the liquid hydrocarbonaceous fuel into the top region so that the particulate solids are coated with the fuel and fuel products. In addition to interactions between the fluidizing gas and the fuel (e.g. partial oxidation of the fuel), there may also be interactions between the fuel and the bed solids (e.g. heat transfer and/or chemical reactions). Thus, if the bed solids contain a sulfur-fixing substance such as calcium oxide, the gasification of the fuel will be accompanied by sulfur-capture of sulfur from the fuel and the combustible fuel gas will be of relatively low sulfur content, provided that the fluidizations conditions are so arranged there is adequate contact between the bed solids and the fuel material.

In one process for which the apparatus so far described is particularly, but not exclusively, suitable, the bed solids are employed as oxygen-donors. For example, if the bed solids comprise an alkaline earth metal sulfate such as $CaSO_4$, the fuel will be at least partially oxidized to combustible fuel gas by reducing the $CaSO_4$ to CaS. Such a reaction may be effected simultaneously with desulfurization of the fuel by providing a sulfur-fixing agent, e.g. CaO, in the bed 16 and ensuring that there is adequate contacting of the fuel material and the oxygen-donating solid. If the $CaSO_4$ (or other reducible oxygen-containing solid) is employed as the sole source of oxygen for the fuel conversion, the resulting fuel gas will be substantially free of inert diluent gases such as nitrogen (which are usually present as a result of the use of air as the source of oxygen for gasification). In a process of this type, the fluidizing gas provided from the plena 18a, 18b would preferably be free of inert gases, and a suitable fluidizing gas would be a portion of the gas product recovered from the top of the vessel 11, and if necessary, cooled and/or cleaned, before being recycled to the plena 18a, 18b. Steam may be added to the recycled gas to promote the oxidation reactions.

In a process in which the oxygen for gasification is furnished by a solid, the oxygen-content of the solids in the bed must be continually renewed for the process to proceed continuously. The oxidation of the reduced oxygen-donating solids is effected in an oxidizer vessel 40 which, as depicted, has similarities with the gasifier vessel 11 as so far described, and receives bed solids via an underflow weir or port, which is defined between the bottom of the wall 15 and the downsloping ramp 25, and which weir or port is in fact the exit port 24 of the gasifier vessel 11. The bed solids are circulated into the oxidizer in the manner described hereinabove: that is to say, vigorous fluidization at the lower end of the exit ramp 25 removes solids from the lower end of the exit ramp at least as quickly as solids accumulate on the exit ramp, and the solids on the exit ramp continuously or intermittently slide down the ramp and are subsequently removed by the vigorous fluidization. If friction inhibits adequately fast movement of solids down the exit ramp 25, the solids on the ramp may be at least partially fluidized to reduce the friction by passing transport gas via one or more conduits 26 and respective nozzles 27. The transport gas may be injected with a horizontal component of velocity to promote solids movement. The bed solids form a bed 41 in vessel 40 whose surface 42 is at about the same level as the surface 30 of bed 16. The vessel 40 has a lower base 43 extending preferably horizontally away from the bottom of the ramp 25 at about the same level as the lower base section 23. Bed solids leave bed 41 of vessel 40 via an underflow weir or port 65 which is, in fact, the entrance port 19 of the gasifier vessel 11. The passage of solids out of port 19 is effected by removing solids from the lower end of the entrance ramp 20 by relatively vigorous fluidization caused by gas rising upwardly at a relatively high rate from the nozzles 17 of base 23, and any friction inhibiting the downward movement of solids along the entrance ramp 20 may be reduced by fluidizing the solids by transport gas supplied via one or more conduits 21 to respective nozzles 22 in the surface of the entrance ramp 20. The transport gas may leave the nozzle(s) 22 with a horizontal component of velocity. An upper base section 44 extends in the vessel 40 at about the level of upper base section 28 from the top of the downsloping ramp 20 to a step 45 which connects the upper base section 44 and lower base section 43. The base sections 43 and 44 are provided with holes or nozzles which receive fluidizing fluid from respective plena 48a, 48b. When the vessel 40 is provided for performing a process in which the oxygen content of reduced oxygen-donating bed solids is renewed, the fluidizing fluid may be any suitable oxygen-containing gas, e.g., air, whereby in the case of CaS, the oxidation is performed under such conditions of temperature and pressure that the CaS is oxidized to $CaSO_4$ with substantially no conversion to other products. The oxidation of CaS to $CaSO_4$ is strongly exothermic, and the heat generated by the reaction may be employed to maintain the temperature of bed 16 at a fuel gasifying temperature. The hot oxygen-depleted air leaving bed 41 may be employed to heat (by heat exchange) the fresh air being passed via conduits 49 to plena 48a, 48b and to the bed 41.

The various plena 18a, 18b and 48a, 48b furnish gases to different depths of bed and are therefore supplied at appropriate pressures to provide the appropriate gas distribution rates in each part of the beds 16, 41.

If transport gas is supplied to the conduits 21, 26, its nature will depend on the process being performed in each vessel 11, 40. For fuel gasification performed as described in bed 16, it is preferred that the transport gas should not be inert so that the combustible fuel gas product is not diluted. Thus, transport gas supplied to conduit 21 may be steam and/or $CO_2$. However, as the amount of transport gas will be small in relation to the total amount of gas passing through bed 16, there may be circumstances in which a transport gas containing inert gas may be acceptable. In such circumstances, the transport gas may be air, flue gas (e.g. obtained from the combustion of the combustible fuel gas product), an inert gas such as nitrogen, or any mixture of the transport gases previously mentioned.

For the oxidation process ($CaS + 2O_2 \rightarrow CaSO_4$) performed in bed 41, any transport gas supplied to conduit 26 may conveniently be air, optionally diluted, e.g. with flue gas, to avoid excessive temperature rises in the vicinity of the nozzle(s) 27.

It will be appreciated that any blockage of the conduits 21, 26 may be relatively easily cleared by rodding out the conduits with a rigid rod.

In the apparatus as so far described, the circulation of bed material through each bed 16 and 41 in one sense enables the size of the entrance and exit ports 19 and 24 to be relatively large. Moreover, in the processing of a substance, such as a hydrocarbonaceous fuel or a suitable mineral passed or injected into the bed 16 relatively close to the wall 14, a horizontal concentration gradient of the substance is obtained with a relatively high concentration adjacent to the region at which the substance is introduced to the bed, and lower concentrations in regions closer to the wall 15 of the process vessel 11. The benefit of a horizontal concentration gradient of this type is that only a very small proportion (if any) of the substance will pass from bed 16 to bed 41 so that the desired processing of the substance will be effected on substantially all of the substance passed into bed 16. If the process is for the gasification of a hydrocarbonaceous fuel, it will be appreciated that any fuel material passing to bed 41 will not contribute to the production of combustible fuel gas produced in bed 16, and will, from that point of view, be wasted.

As will be seen from FIG. 1, the process vessel 11 is partly divided by a partition 55 which extends downwardly from its contact with the top 56 of vessel 11 to a level below the surface 30 of the bed 16 but above the base of the vessel 11. When the substance to be processed in bed 16 produces gases and/or vapours during processing, and the vapours and/or gases are worth recovering for their value or some other reason (e.g. their toxicity), the substance is preferably passed into the bed 16 between the wall 14 and the partition 55 at such a level that vapours and/or gases rise into the freeboard space above bed 16 between wall 14 and partition 55 for recovery via a suitable conduit, designated 57. In the case of many hydrocarbonaceous fuels, the initial contact between the fuels and the high temperature bed material causes the flashing-off of hydrocarbon vapours and gases and hydrogen comprising a "rich" or high calorific value gas, the non-flashed part of the fuel remaining in the bed as a carbon-rich solid which is convertible and converted to combustible fuel gas downstream of the partition 55 (i.e. in the bed region between the partition 55 and the wall 15).

It will be seen that the partition 55 is inclined so as to be slightly convergent towards the end wall 14. This inclination reduces the amount of fluidizing gas which can pass upwardly adjacent to the right-hand (as shown) face of the partition 55 within the bed 16 so that solids become defluidized in the vicinity of the right-hand face and sink in the bed, some particles passing under the partition 55 to the relatively vigorously fluidized region on the left-hand face, as indicated by the arrows 58. The downflow of defluidized solids at the right-hand face of partition 55 promotes a corresponding upflow of bed solids in regions near the wall 14, as indicated by arrows 59 so that the substance being processed is exposed to bed solids which have risen from the vicinity of the entrance to the bed 16 so as to enhance the amount and rate of chemical reaction due to interactions between the substance (e.g. fuel substance) and the bed solids.

Between the partition 55 and the wall 15 is a baffle 60, the top of which is spaced from the top 56 of vessel 11, and the bottom of which extends into the bed 16 to a level somewhat below the bottom level of the partition 55. The baffle 60 is downwardly inclined away from the wall 15 so as to cause a downflow of defluidized solids at its immersed right-hand (as shown) face and an upflow of fluidized solids at its immersed left-hand (as shown) face. The latter upflow is useful in increasing the contact and thereby the interactions between the bed solids and the residue of the substance (e.g. fuel substance) being processed and also in reducing the amount of residual substance which passes out of the exit port 24. In the case of hydrocarbonaceous fuels undergoing gasification, the residual substance will very largely be carbon, and its gasification product will be oxides of carbon, preferably with carbon monoxide predominating if the operating conditions are appropriate. The gas product (e.g. combustible fuel gas from carbon gasification) is recovered from the freeboard space above the top of the bed 16 via a conduit 61 located between the partition 55 and the baffle 60.

The portion of the baffle 60 above the top surface 30 of bed 16 serves, to some extent, to reduce the entrainment of fine solids in the gas passing to the conduit 61.

In the processing of fuel substances to combustible fuel gas, it is preferred to regulate the fluidizing conditions within the bed 16 so that the fuel substance tends to form a discrete stratum at the top region of bed 16, the action of the immersed parts of the partition 55 and baffle 60 serving to promote intermixing and interaction of the bed solids and the fuel substance in the vicinity of the said immersed parts. However, the operating conditions should be such that the fuel substance does not tend to become well mixed with the bed solids, but rather to separate therefrom and migrate to the top region of the bed 16.

For compactness and heat conservation reasons, the vessel 11 is shown as being received or incorporated in the vessel 40, but other arrangements are also within the ambit of the invention—e.g. the vessel 40 may be received or incorporated on the vessel 11 if the relative sizes of the vessels permit this. The vessels 11 and 40 may, alternatively, be completely separated from each other and provided with suitable ducts for the transfer of bed solids from one vessel to the other.

Although the ramps 20 and 25 are both shown as terminating at their lower ends where they join the edges respective lower base sections 23 and 43, one or both of the ramps may terminate above the edge(s) of the lower base section(s), there being a wall part (not shown) extending upwardly from the edge(s) to the lower end of the respective ramp(s). The wall part may be either substantially vertical or somewhat inclined so that the bed space is upwardly divergent towards the lower end of the ramp.

When the apparatus of the invention is employed to process a hydrocarbonaceous fuel, there will usually be some entrainment of fuel solids with the gases leaving the process vessel 11 via lines 57 and 61 (in some instances, about 30% of the carbon content of a coal may be thus entrained). In addition, there will also usually be fine bed solids entrained in the gases. In order to recover at least some of the fuel solids for further processing, the gases are preferably passed through a solids separation device (e.g. a cyclone), and the solids thus recovered may be returned, at least in part, to the bed 16. In order to increase the residence time in the bed 16 of the thus returned solids for increased processing thereof, it is preferred to pass the returned solids into a bottom region of the bed 16. A convenient method of effecting this return of recovered solids is to entrain the recovered solids in a transport gas which is passed into the bed 16 e.g. via one or more of the conduits 21 so that the fuel solids (preferably still hot) mix with hot bed particles entering the bed 16 via the entrance port 19. In the instances where there is a wall part extending upwardly to the lower end of the entrance ramp 20 from the edge of the lower base section 23, the recovered fuel solids may be entrained for return to the bed 16 via one or more nozzles in the wall part.

The recovery of entrained solids from the gas products may be effected in at least two stages. In a first stage, relatively large particles (which will tend to be fuel rich) are recovered and may be returned to the bed 16 as described, at least in part. In a subsequent stage, relatively finer particles are recovered and these may be circulated to the bed 41 for oxidation of CaS to CaSO$_4$ to produce heat.

Although the apparatus of the invention has been described with particular reference to its use for converting hydrocarbonaceous liquid and/or solid fuels to fuel gases (which may also be suitable for chemical synthesis purposes), it will be appreciated that other substances, such as garbage or metal-containing ores or other minerals, may also be processed in the apparatus.

I claim:

1. Apparatus comprising a fixed vessel, wherein the vessel comprises:
   (a) outer walls;
   (b) inner wall means which define at least two compartments within the vessel, wherein said inner wall means comprises at least one dividing wall, each said dividing wall extending inwardly from an outer wall towards the interior of the vessel to define a discharge end of a first compartment on one side of the dividing wall and a receiving end of a second compartment on the other side thereof;
   (c) at least one distributor for distributing fluidizing fluid into the bottom of each compartment for fluidizing a bed of fluidizable particles which, when present, is supported above and bounded by said distributor;
   (d) each distributor comprising a substantially horizontal first distributor portion extending, at a first level, from the receiving end of the respective compartment to an edge region of the distributor portion at a location part-way towards the discharge end of the compartment; a substantially horizontal second distributor portion extending at a second level, higher than the said first level, from the discharge end of the compartment to an edge region of the second distributor portion which is located substantially vertically above the said edge region of the first distributor portion; a substantially vertical step connecting the edge regions of the first and second distributor portions; and a plenum defined beneath each distributor portion for the supply of fluidizing fluid to each distributor portion;
   (e) said at least one dividing wall defining at least part of at least one particles-transfer port means which slopes downwardly from an entrance-opening on said one side of the dividing wall to an exit-opening on the other side thereof, the bottom of the port means on the said other side of the dividing wall being no lower than the said first level.

2. Apparatus as in claim 1 in which the top of the port means on one side of the dividing wall is no higher than the said second level.

3. Apparatus as in claim 2 in which the top of the port means on said one side is substantially at the second level.

4. Apparatus as in claim 3 in which the bottom of the port means on said other side is substantially at the first level.

5. Apparatus as in claim 4 comprising at least one passage defined through the bottom surface of the said port means and having an orifice defined in the bottom surface of said port means for passing fluid into the bottom of the port means so that particles will move downwards through the port.

6. Apparatus as in claim 5 in which the bottom surface of the port means is in the form of an inclined ramp which adjoins the second distributor portion of the second compartment at the receiving end of the said second distributor portion and which adjoins the first distributor portion of the first compartment at the discharge end of the first compartment.

7. Apparatus as in claim 6 in which the inclination of the ramp is steeper than the angle of repose of the fluidizable material when the latter is not fluidized.

8. Apparatus as in claim 6 wherein the inner wall means comprises at least two dividing walls, and feed means are provided to supply a substance to the interior of one compartment, preferably at the receiving end thereof.

9. Apparatus as in claim 8 comprising a roof defining the top of at least one compartment.

10. Apparatus as in claim 9 comprising a segregating baffle extending downwardly from the roof to a level above the distributor but below the top level of the said fluidizable bed, when present, and located so that said feed means operates to supply said substance into said one compartment at a location which is between (a) one of (i) the segregating baffle and (ii) a vertical plane extending downwardly from the lower end of the segregating baffle and (b) the said other side of the dividing wall bounding the receiving end of said compartment, the roof having an opening for the discharge of fluid from the space between the segregating baffle and the said dividing wall bounding the receiving end of the compartment.

11. Apparatus as in claim 10 in which at least the lower end of the segregating baffle extends downwardly and convergently towards the upstream dividing wall.

12. Apparatus as in claim 11 comprising a deflecting baffle disposed between the segregating baffle and the said one side of the dividing wall bounding the discharge end of the compartment, the deflecting baffle defining a passage for fluid at or near to the top of the deflecting baffle, the roof having an aperture for the discharge of fluid from the space defined between the segregating baffle and the said dividing wall bounding the discharge end of the compartment.

13. Apparatus as in claim 12 in which the deflecting baffle extends downwardly to a level above the distributor but below the top level of the fluidizable bed, when present, and wherein at least the part of the deflecting baffle facing downstream towards the said one side of the dividing wall bounding the discharge end of the compartment and which is below the said top bed level diverges downwardly away from the said dividing wall bounding the discharge end of the compartment, and at least the part of the deflecting baffle facing in the direction of the receiving end of the compartment and which is below the said top bed level is substantially vertical.

* * * * *